(12) United States Patent
Rondelli

(10) Patent No.: US 10,022,010 B2
(45) Date of Patent: Jul. 17, 2018

(54) METHOD, SYSTEM AND CAPSULE FOR PREPARING A BEVERAGE

(75) Inventor: Raffaele Rondelli, Argelato (IT)

(73) Assignee: MACCHIAVELLI S.R.L., San Lazzaro di Savena (IT)

( * ) Notice: Subject to any disclaimer, the term of this patent is extended or adjusted under 35 U.S.C. 154(b) by 0 days.

(21) Appl. No.: 14/344,294

(22) PCT Filed: Sep. 14, 2012

(86) PCT No.: PCT/IB2012/054823
§ 371 (c)(1),
(2), (4) Date: May 19, 2014

(87) PCT Pub. No.: WO2013/038383
PCT Pub. Date: Mar. 21, 2013

(65) Prior Publication Data
US 2014/0255563 A1  Sep. 11, 2014

(30) Foreign Application Priority Data
Sep. 14, 2011  (IT) .............................. BO2011A0524

(51) Int. Cl.
*A47J 31/06* (2006.01)
*B65D 81/32* (2006.01)
*A47J 31/40* (2006.01)
*B65D 85/804* (2006.01)
*A23F 5/26* (2006.01)

(52) U.S. Cl.
CPC .............. *A47J 31/407* (2013.01); *A23F 5/262* (2013.01); *B65D 85/8043* (2013.01)

(58) Field of Classification Search
CPC ...... A23F 5/262; A47J 31/407; B65D 85/8043
USPC ........... 426/115, 432; 99/275, 279, 280–283, 99/287–303, 302 R, 307
See application file for complete search history.

(56) References Cited

U.S. PATENT DOCUMENTS

| 2003/0005826 A1 | 1/2003 | Sargent et al. | |
| 2006/0249030 A1* | 11/2006 | Bienvenu | A47J 31/3676 99/291 |

(Continued)

FOREIGN PATENT DOCUMENTS

| CN | 101179972 | 5/2008 |
| CN | 101304927 | 11/2008 |

(Continued)

OTHER PUBLICATIONS

International Search Report and Written Opinion from International Application No. PCT/IB2012/054823 dated Jan. 17, 2013.

(Continued)

*Primary Examiner* — Dana Ross
*Assistant Examiner* — Ket D Dang
(74) *Attorney, Agent, or Firm* — Dorsey & Whitney LLP

(57) ABSTRACT

The method comprises a first step during which with a capsule inserted into a percolation element and of the type presenting different chambers each of which containing a corresponding infuse, a water flow coming from a tank is caused to reach a predetermined temperature and a second step during which the water flow is directed towards a plurality of channels each of which is defined by a respective chamber and by a respective outlet area of said capsule.

12 Claims, 4 Drawing Sheets

(56) References Cited

U.S. PATENT DOCUMENTS

| | | | |
|---|---|---|---|
| 2007/0186784 A1* | 8/2007 | Liverani et al. ............... 99/295 |
| 2008/0156196 A1* | 7/2008 | Doglioni Majer .. A47J 31/0673 99/295 |
| 2008/0250937 A1* | 10/2008 | Fraij ................... A47J 31/4485 99/295 |
| 2008/0264267 A1* | 10/2008 | Doglioni Majer . B65D 85/8043 99/295 |
| 2010/0018404 A1* | 1/2010 | Villa ........................ A47J 31/56 99/288 |
| 2010/0062127 A1* | 3/2010 | Bongers ............. B65D 85/8043 426/431 |
| 2010/0154647 A1* | 6/2010 | Skalski ............... A47J 31/0668 99/290 |
| 2010/0203198 A1* | 8/2010 | Yoakim et al. ................. 426/80 |
| 2010/0206177 A1* | 8/2010 | Ricotti ................ A47J 31/0673 99/295 |
| 2011/0151075 A1* | 6/2011 | Peterson ....................... 426/238 |

FOREIGN PATENT DOCUMENTS

| CN | 101384200 | 3/2009 |
| EP | 1704803 A1 * | 9/2006 |

OTHER PUBLICATIONS

International Preliminary Report on Patentability from International Application No. PCT/IB2012/054823 dated Jan. 24, 2014.

\* cited by examiner

METHOD, SYSTEM AND CAPSULE FOR PREPARING A BEVERAGE

TECHNICAL FIELD

The present invention relates to a method for preparing a beverage of the infusion type.

The present invention also relates to a system implementing the above method.

BACKGROUND ART

Generally, when one wants to prepare a beverage by infusion formed by mixing at least two products (for example, to prepare a cappuccino which, as well known consists of coffee and milk foam) is used a capsule or a chamber in which products are already mixed or a capsule in which are defined two chambers, one for each product and one overlapping the other. For the two chambered capsules in use hot water under pressure is channeled in the upper chamber so as to create a first infusion with the first product and then through the openings the first infusion is channeled towards the second chamber so as to mix with the second product to create the beverage. It seems obvious that if coffee and milk are used as products the outcoming beverage from the capsule is not a real cappuccino but rather a normal milk and coffee. In fact, a real cappuccino involves separate preparation of coffee and of a milk foam, which are then always poured separately in a cup.

DISCLOSURE OF INVENTION

The purpose of the present invention is to provide a method for preparing a beverage formed by mixing multiple infusions that is without the above mentioned drawback and which allows the mixing of infusions once said infusions are made.

The purpose of the present invention is also to provide a system that implements the above method.

A further object of the present invention is to provide a capsule which is without the above mentioned drawbacks.

According to the present invention a method for preparing a beverage is provided characterized by comprising:

a first step during which, by means of a capsule that is inserted into a percolation element and is of the type presenting different chambers, each containing a corresponding infuse, a water flow coming from a tank is caused to reach a predetermined temperature; and a second step during which the water flow is directed towards.

a plurality of channels, each of which is defined by a respective chamber and by a respective outlet area of said capsule.

According to the present invention, a system for preparing a beverage is provided characterized by comprising:
 a water tank;
 a percolation element;
 a capsule, which is inserted into said percolation element and presents a plurality of infusion chambers, each of which contains a corresponding infuse and presents a distinct outlet area;
 a plurality of channels, each of which is defined by a respective chamber and by a respective outlet area of said capsule;
 means for controlling the water flow along said channels; and means for bringing said water flow to a predetermined temperature.

According to the present invention a capsule is further provided for preparing a beverage of the type comprising a cup-shaped body closed at the top by a lid, characterized in that it has a plurality of infusion chambers in its inside each provided with a respective area for the inlet of a water flow and each provided with a respective area for the outlet of the infusion.

BRIEF DESCRIPTION OF THE DRAWINGS

For a better understanding of the invention an embodiment is herein described purely by way of illustration and not of limitation with the aid of the accompanying figures, wherein.

BEST MODE FOR CARRYING OUT THE INVENTION

Figure 1:
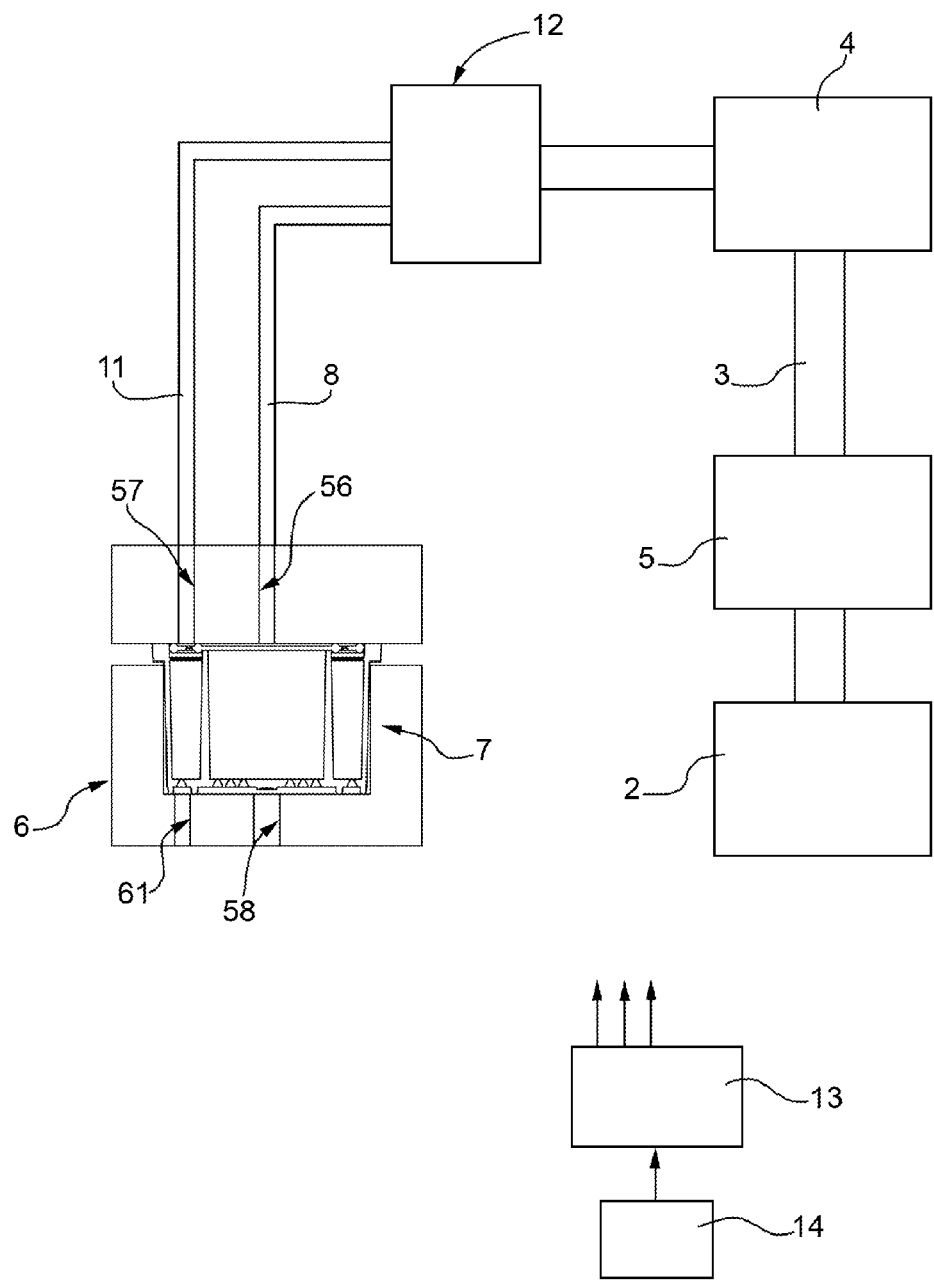
FIG. 1 is a block diagram of a system for preparing a beverage according to the teachings of the present invention.

With reference to FIG. 1 a system for preparing a beverage is indicated as a whole.

The system 1 comprises:
 a water tank 2;
 a first duct 3 which originates from the tank 2;
 a heat exchanger 4 (preferably of the type with electrical power supply) installed along the duct 3 and adapted to bring to a predetermined temperature the outlet water from the tank 2;
 a pump 5 installed along the duct 3 and adapted to channel along this latter the water drawn from the tank 2;
 a percolation element 6;
 a capsule 7 installed inside the percolation element 6;
 a second duct 8 adapted to channel water from the first duct 3 to a first area of said percolation element 6;
 a third duct 11 adapted to channel water from the first duct 3 to a second area of said percolation element 6;
 an element 12 adapted to be controlled to select the water flow from the first duct 3 towards the second duct 8 and/or towards the third duct 11; and
 an electronic control unit 13 adapted, once the data are set by the user on a control panel 14, to control the different elements and devices of the system 1.

Figure 2:
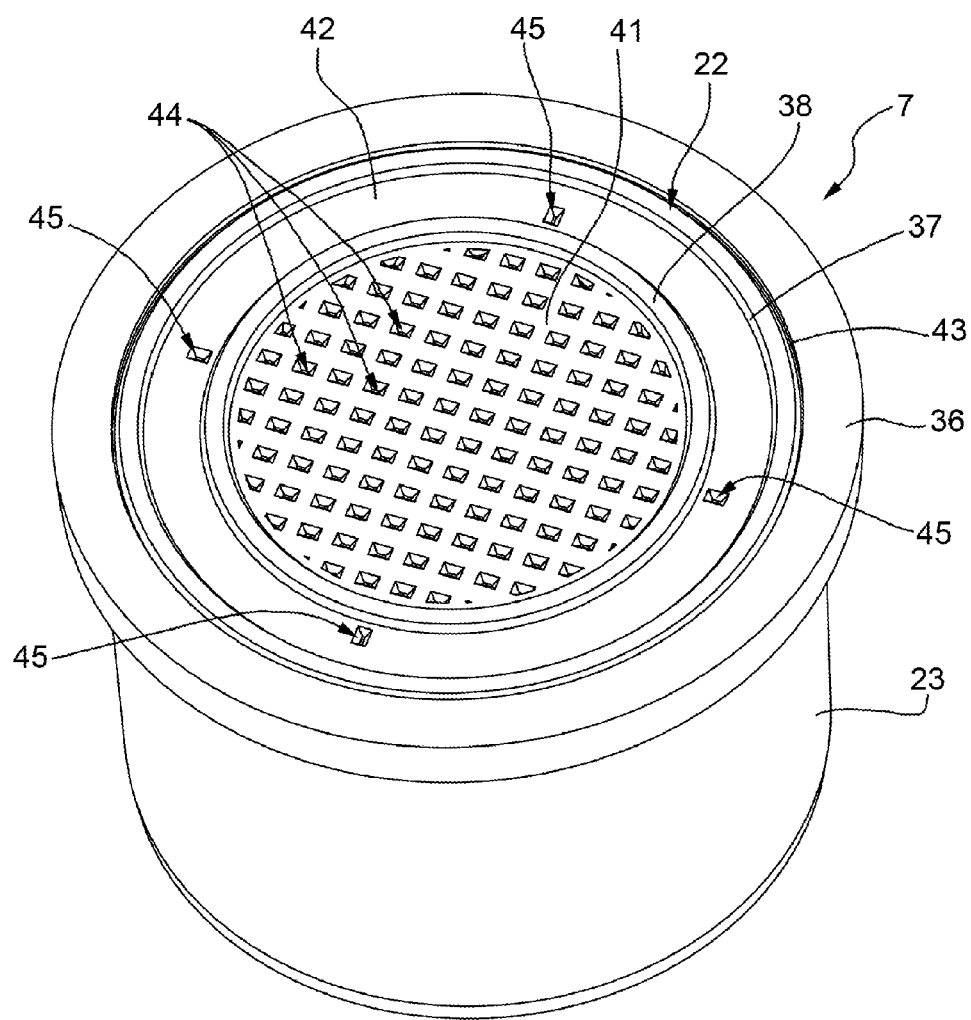
FIGS. 2 and 3 are perspective views according to different angles of a capsule.
Figure 3:
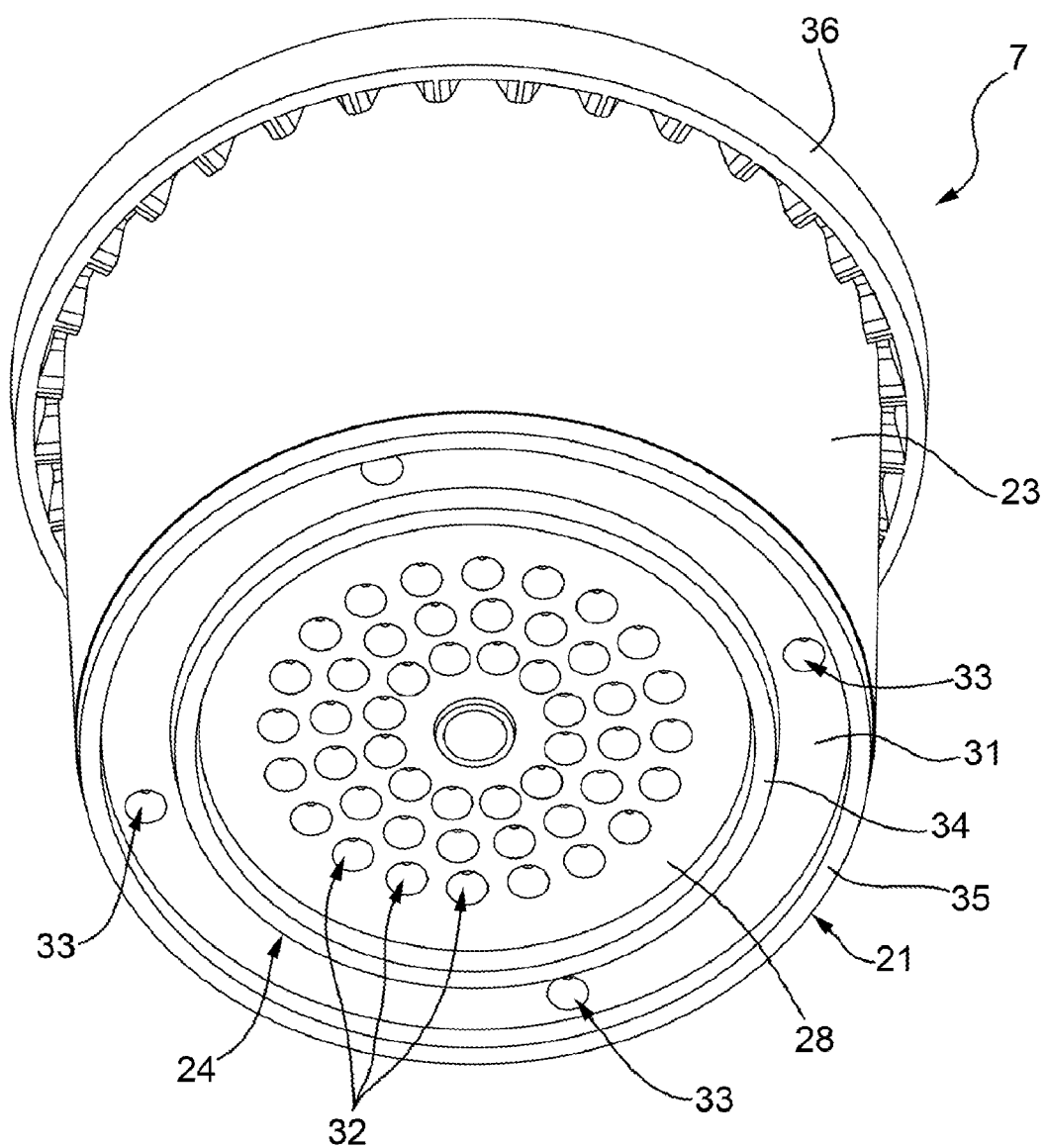
Figure 4:
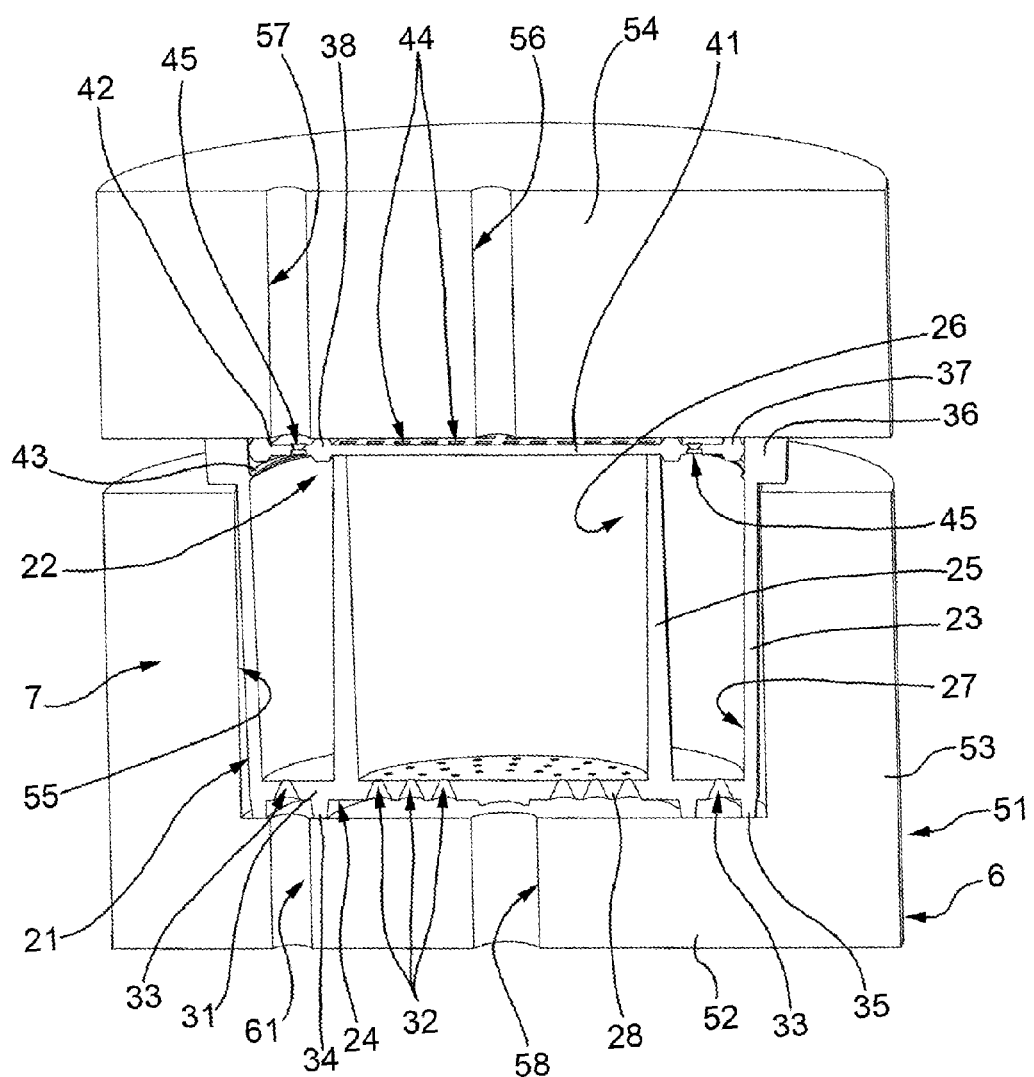
FIG. 4 is a perspective view, partial and in section of a capsule inserted in a percolation chamber.

As illustrated in FIGS. 2 to 4, the capsule 7 comprises a cup-shaped body 21 closed on the upper side by a lid 22 in the form of a disc. The cup-shaped body 21 presents a lateral wall 23 with cylindrical shape and a base wall 24. One intermediate wall 25, which divides the inside of said cup-shaped body 21 into two infusion chambers 26 and 27, being present inside the cup-shaped body 21 and being made as one single piece together with the base wall 24, from which it extends parallel to the lateral wall 23. The chamber 27 is concentric to the chamber 26 and is delimited at the bottom by an annular portion 31 of the base wall 24 and laterally by the outer face of the intermediate wall 25 and by the inner face of the lateral wall 23. In the central portion 28 of the base wall 24 a first outlet area is obtained which in this embodiment is defined by a plurality of through holes 32. In the annular portion 31 of the base wall 24 a second outlet area is obtained which in this embodiment is defined by a plurality of through holes 33. Two annular projections 34 and 35 originate from the outer face of the base wall 24 and extend downwards. The projection 34 is next to the intermediate wall 25 and delimits the aforementioned first outlet area. While the projection 35 is substantially a continuation of the lower end of the lateral wall 23 and together with the projection 34 delimits the aforementioned second outlet area. The lateral wall 23 at its upper end has an annular edge 36 of thickness greater than the remaining part of the same wall 23; edge 36 that extends from the outer face of the wall 23.

The lid 22 has two annular thickenings 37 and 38 defining two portions 41 and 42. The thickening 37 is formed along the peripheral edge of the lid 22 and with the lid 22 mounted it abuts against an annular projection 43 obtained on the inner face of the lateral wall 23 near the upper end thereof. The thickening 38 is concentric to the thickening 37 and with lid 22 mounted it ends up near the upper end of the intermediate wall 25. In the portion 41, which is central and which is delimited by thickening 38, is defined a first inlet area. In the portion 42, which is annular and which is delimited between the two thickenings 37 and 38, is defined a second inlet area. The first inlet area has a plurality of through holes 44 and the second inlet area has a plurality of through holes 45 uniformly distributed along the portion 42.

As can be seen with the lid mounted inside the capsule 7 were defined the two chambers 26 and 27 which are separated from one another and substantially sealed in a fluid-tight manner with respect to each other. The chamber 26 is delimited at the bottom by the portion 28 of the base wall 24, laterally by the inner face of the intermediate wall 25 and at the top by the portion 41 of the lid 22. Is to be highlighted that after assembly of the lid 22, the peripheral edge of the portion 41 near the thickening 38 abuts against the upper end of the intermediate wall 25 therefore obtaining a substantial seal in a fluid-tight manner between the chamber 26 and the chamber 27.

The chamber 27 is delimited at the bottom by the portion 31 of the base wall 24, laterally by the outer face of the intermediate wall 25 and by the inner face of the lateral wall 23 and on the upper side by the portion 42 of the lid 22. To be highlighted is that the inner face of the lateral wall 23 is slightly flared upwards and the diameter of the lid 22 is such that after assembly the peripheral edge of the lid 22 is pressed with force upon the inner face of the lateral wall 23 so as to obtain a seal in a fluid-tight manner of the chamber 27.

In essence, the capsule 7 has two separate chambers 26 and 27 and sealed in a fluid-tight manner with respect to each other and each chamber 26 and 27 has a respective area for the inlet of a fluid and a respective area for the outlet of a fluid.

With reference to FIGS. 1 and 4, the percolation element 6 comprises a lower cup-shaped body 51 having a base wall 52 and a cylindrical lateral wall 53. The element 6 also comprises a plate 54 covering the upper edge of the lateral wall 53. The element 6 thus defines a percolation chamber 55 delimited at the bottom by the inner face of the base wall 52, laterally by the inner face of the lateral wall 53 and on the upper side by the inner face of the covering plate 54. As can be seen from FIG. 4, as capsule 7 is inserted in the percolation chamber 55, the plate 54 is pressed upon the thickenings 37 and 38 creating a seal between the two inlet areas defined in the lid 22 of the capsule 7. The plate 54 also presses against the upper edge of the lateral wall 53 the edge 36 of the capsule 7. In this way a seal from the percolation chamber 55 towards the exterior is obtained. Finally always from FIG. 4 it can be seen that the projections 34 and 35 abut against the inner face of the base wall 52 of the body 51 obtaining both a seal in a fluid-tight manner between the two mentioned outlet areas of the capsule 7 and from the same towards the space defined between the outer surface of the capsule 7 and the percolation chamber 55.

In the plate 54 two through holes 56 and 57 are obtained of which the hole 36 has an upper end in which one end of the duct 8 is inserted and a lower end which is brought in correspondence with the portion 41 of the lid 22 and therefore with the above-mentioned first inlet area of the capsule 7. In particular, the hole 56 is obtained aligned with the longitudinal axis of the chamber 55 and therefore of the capsule 7. The hole 57 has an upper end wherein one end of the duct 11 is inserted and a lower end which is in correspondence with the portion 42 of the lid 22 and therefore with the aforementioned second inlet area of the capsule 7. The base wall 52 of the body 51 also presents two through holes 58 and of which the hole 58 has an upper end that is in correspondence with the aforementioned first outlet area of the capsule 7 and a lower end that flows outside the percolation chamber 55. In particular, the hole 61 is realized aligned with the hole 57.

It is important to note that from the element 12 two distinct channels are configured one for each infusion injected into the capsule 7. The first channel provides the duct 8, the hole 56, the chamber 26 and the hole 58. The second channel provides the duct 11, the hole 57, the chamber 27 and the hole 61. This division of the channels involves the possibility of feeding at the same time the two channels so that the two flows of water once meeting the corresponding infusion are then mixed into a container placed underneath the percolation element 6. Or the division of the channels may lead a first water flow along a first channel and subsequently a second water flow along the second channel so that the second flow passing through the second infusion falls in the container which already contains the first water flow passed through the first infusion. Ultimately the two infusions can mix in the aforementioned container or while being channeled in the container itself or in subsequent times.

In essence the method for preparing a beverage comprises: a first step where the capsule 7 is inserted in the percolation element 6 and controls the electrical power supply of the heat exchanger 4; and a second step wherein, at a predetermined temperature reached by the water in the heat exchanger 4, the pump 5, which channels the water along the duct 3 and along the two channels defined by the first duct 8, by the hole 56, by the chamber 26 and by the hole 58 and the second one defined by the duct 11, by the hole 57, by the chamber 27 and by the hole 61, is controlled.

The control unit 13 by way of controlling the element 12 can control the water flow at the same time along the aforementioned channels or control the water flow in subsequent times along the two channels. Furthermore, it is possible to select the flow rate for each channel through the element 12 and/or byway of the aperture (number of holes 44 and 45) of the inlet areas of the capsule 7 and/or through the inner diameter of the ducts 8 and 11 and of the holes 56 and 57. Using the element 12 to determine the flow rate, the same can be controlled by setting a series of data by way of the control panel 14. The element 12 is nothing more than a hydraulic valve preferably electrically controlled of a known type with an inlet and two outlets and with a shutter adapted to open the passage of water between the inlet and the two outlets (with the possibility of varying the aperture of each outlet) or between the inlet and one only outlet.

It seems evident that a possible variant of the method described above could provide the splitting of the main duct 3 into two ducts of which the first adapted to hydraulically connect the tank 2 with the duct 8 and the second adapted to hydraulically connect the tank 2 with the duct 11. In this way it is possible to provide each channel with its own pump and its own heat exchanger and then it is possible to select for each channel not only the flow rate of water but above all the temperature of the water flow. This variant might be useful for some infusions that need water temperatures different from those used for other infusions to improve the organoleptic properties and/or to improve the infusion process.

It also appears evident that using a capsule 7 with a greater number of chambers is possible not only to use multiple infusions (one per chamber) but also with the same capsule 7 decide which mixture of infusions may constitute the beverage. In fact it can be expected to select which channels are to be fed with the corresponding water flow, with which flow rate and at what temperature.

A further variant may provide the absence of the thickening 38 in the lid 22, and therefore the water flow towards the inlet areas of the capsule 7 may provide a single duct between the ducts 8 and 11 and a single hole between the holes 56 and 57 as the main feature is to provide two distinct outlet areas from the capsule 7 one for each infusion.

From that above described are evident numerous advantages achieved with the embodiment of the present invention.

In particular it is provided a method for preparing a beverage wherein a capsule with several chambers (an infusion per chamber) is provided which allows a channeling of a water flow for each chamber of the capsule. It appears obvious that if for example an infusion is defined by coffee powder and the second infusion is defined by milk powder or liquid milk, the beverage obtained is a real cappuccino and not a normal milk and coffee. Moreover with the method described above it is possible to control the hydraulic supply of the channels at the same time or at subsequent moments. It is to emphasize that it is possible to select the flow rate of water flow for each channel and also the temperature of said water flow. Finally, for capsules with a number of chambers of more than two units, it is possible to select which chambers are to be engaged by the water flow.

The invention claimed is:

1. A system for preparing a beverage, the system comprising:
   a water tank;
   a percolation element;
   a single capsule inserted into the percolation element, the single capsule including a plurality of fluidly separate infusion chambers each of which contains a corresponding powdered infuse and presents a distinct outlet area;
   a plurality of channels each of which is defined respectively by a duct, by an inlet hole in the percolation element, by a respective one of the plurality of fluidly separate infusion chambers of the single capsule, and by an outlet hole in the percolation element, wherein each of the plurality of channels is coupled to and partially defined by the same single capsule;
   first and second pumps for controlling water flow along the plurality of channels;
   a first duct that originates from the water tank;
   a first heat exchanger fluidly coupled to the first duct, the first heat exchanger for bringing a first water flow pumped by the first pump through the first duct to a first predetermined temperature;
   a second duct that originates from the water tank;
   a second heat exchanger fluidly coupled to the second duct, the second heat exchanger for bringing a second water flow pumped by the second pump through the second duct to a second predetermined temperature, wherein the second water flow is different from the first water flow and the second predetermined temperature is different than the first predetermined temperature;
   a valve means for feeding the first water flow from the first duct to at least one of the plurality of channels and for feeding the second water flow from the second duct to at least another one of the plurality of channels, the valve means spaced from the single capsule; and
   wherein the percolation element includes a percolation chamber that houses the single capsule, the percolation chamber includes:
      a plurality of water flow inlets, one of the plurality of water flow inlets for each one of the plurality of channels; and
      a plurality of outlets, one of the plurality of outlets for each one of the plurality of channels.

2. The system according to claim 1, wherein each one of the plurality of channels includes a second hydraulic connection duct between the first duct and the corresponding inlet of the percolation chamber.

3. The system according to claim 1, further comprising an electronic control unit, which is provided with a data setting panel and configured to control at least the valve means.

4. The system according to claim 1, wherein each of the plurality of fluidly separate infusion chambers are sealed in a fluid-tight manner with respect to each other.

5. The system according to claim 1, wherein the single capsule includes a lid having a plurality of through holes therein.

6. The system according to claim 1, where the lid includes at least two annular thickenings, the at least two annular thickenings defining a plurality of inlet areas, each of the plurality of inlet areas including a plurality of through holes and corresponding to one of the plurality of fluidly separate infusion chambers.

7. The system according to claim 6, wherein the percolation element includes a plate, the plate configured to press upon the two or more annular thickenings and create a seal between the plurality of inlet areas.

8. The system according to claim 1, wherein the single capsule includes:
   a base wall that at least partially defines the plurality of fluidly separate infusion chambers and contains the distinct outlet area for each of the plurality of fluidly separate infusion chambers; and
   one or more projections extending from the base wall of the single capsule and away from the plurality of fluidly separate infusion chambers, the one or more projections defining each distinct outlet area.

9. The system according to claim 8, wherein the percolation element includes an element base wall having the plurality of outlets formed therein, wherein the one or more projections extending from the base wall of the single capsule are configured to press against the element base wall of the percolation element and create a seal between each distinct outlet area and each of the plurality of outlets.

10. The system according to claim 1, wherein at least one of the plurality of fluidly separate infusion chambers is positioned concentrically about another one of the plurality of fluidly separate infusion chambers.

11. The system according to claim 1, wherein the plurality of fluidly separate infusion chambers includes two infusion chambers.

12. A system for preparing a beverage, the system comprising:
- a water tank;
- a percolation element;
- a single capsule inserted into the percolation element, the single capsule including a plurality of fluidly separate infusion chambers each of which contains a corresponding powdered infuse and presents a distinct outlet area;
- a plurality of channels each of which is defined respectively by a duct, by an inlet hole in the percolation element, by a respective one of the plurality of fluidly separate infusion chambers of the single capsule, and by an outlet hole in the percolation element, wherein each of the plurality of channels is coupled to and partially defined by the same single capsule;
- first and second pumps for controlling the water flow along the plurality of channels;
- a first duct that originates from the water tank;
- a first heat exchanger fluidly coupled to the first duct, the first heat exchanger for bringing a first water flow pumped by the first pump through the first duct to a first predetermined temperature;
- a second duct that originates from the water tank;
- a second heat exchanger fluidly coupled to the second duct, the second heat exchanger for bringing a second water flow pumped by the second pump through the second duct to a second predetermined temperature, wherein the second water flow is different from the first water flow and the second predetermined temperature is different than the first predetermined temperature; and
- a hydraulic valve spaced from the single capsule and configured for feeding the first water flow from the first duct to at least one of the plurality of channels, the hydraulic valve further configured for feeding the second water flow from the second duct to at least another one of the plurality of channels;

wherein the percolation element includes a percolation chamber that houses the single capsule, the percolation chamber includes:
- a plurality of water flow inlets, one of the plurality of water flow inlets for each one of the plurality of channels; and
- a plurality of outlets, one of the plurality of outlets for each one of the plurality of channels.

* * * * *